United States Patent
Maher et al.

(10) Patent No.: US 12,470,407 B2
(45) Date of Patent: Nov. 11, 2025

(54) ENHANCED TRANSPORT LAYER SECURITY ENCRYPTION CERTIFICATION MANAGEMENT SYSTEMS AND METHODS

(71) Applicant: Level 3 Communications, LLC, Broomfield, CO (US)

(72) Inventors: Matthew Maher, St. Charles, MO (US); George McFalls, Colorado Springs, CO (US); Michael Chan, Auburndale, FL (US); Craig Foucher, Flat Rock, MI (US); Darren Behmlander, White Lake, MI (US); Michael Miller, West Bloomfield, MI (US)

(73) Assignee: Level 3 Communications, LLC, Denver, CO (US)

( * ) Notice: Subject to any disclaimer, the term of this patent is extended or adjusted under 35 U.S.C. 154(b) by 276 days.

(21) Appl. No.: 18/507,547

(22) Filed: Nov. 13, 2023

(65) Prior Publication Data

US 2024/0163114 A1 May 16, 2024

Related U.S. Application Data

(60) Provisional application No. 63/383,890, filed on Nov. 15, 2022.

(51) Int. Cl.
*H04L 29/06* (2006.01)
*H04L 9/32* (2006.01)

(52) U.S. Cl.
CPC .................. *H04L 9/3268* (2013.01)

(58) Field of Classification Search
CPC ........................ H04L 9/3268; H04L 9/3265
See application file for complete search history.

(56) References Cited

U.S. PATENT DOCUMENTS

| | | | | |
|---|---|---|---|---|
| 11,190,504 | B1* | 11/2021 | Ah Kun | H04L 9/3247 |
| 2010/0082977 | A1* | 4/2010 | Boyle | H04L 63/0815 |
| | | | | 713/158 |
| 2018/0034646 | A1* | 2/2018 | Kuramoto | H04L 9/3268 |
| 2018/0041346 | A1* | 2/2018 | Rathinasabapathy | |
| | | | | H04L 9/3263 |
| 2018/0205619 | A1* | 7/2018 | Rios | H04L 67/10 |
| 2018/0234256 | A1* | 8/2018 | Bowen | H04L 63/0823 |

FOREIGN PATENT DOCUMENTS

| | | | | | |
|---|---|---|---|---|---|
| CN | 106385315 | A | * | 2/2017 | H04L 9/3268 |
| CN | 110677240 | A | * | 1/2020 | H04L 9/3268 |
| CN | 108370374 | B | * | 3/2021 | H04L 63/0823 |
| CN | 116095682 | A | * | 5/2023 | H04W 12/069 |
| WO | WO-2018157247 | A1 | * | 9/2018 | H04L 9/3268 |
| WO | WO-2018202109 | A1 | * | 11/2018 | H04L 9/40 |

* cited by examiner

*Primary Examiner* — Sher A Khan

(57) ABSTRACT

This disclosure describes systems, methods, and devices related to installing a security certificate. A method may include identifying, by a network provisioning abstraction layer (NPAL) of a network provisioning system, a digital certificate file received from a certificate management system (CMS); identifying a session boarder controller (SBC) that supports transport layer security (TLS); uploading the digital certificate file to the identified SBC; installing a remote certificate at the identified SBC; enabling the remote certificate at the identified SBC; and sending, based on enabling the remote certificate at the identified SBC, a notification to the CMS indicating that a remote certificate has been installed at the identified SBC.

19 Claims, 8 Drawing Sheets

ENHANCED TRANSPORT LAYER SECURITY ENCRYPTION CERTIFICATION MANAGEMENT SYSTEMS AND METHODS

CROSS-REFERENCE TO RELATED APPLICATIONS

This application is related to and claims priority under 35 U.S.C. § 119(e) from U.S. Patent Application No. 63/383,890, filed Nov. 15, 2022, titled "ENHANCED TRANSPORT LAYER SECURITY ENCRYPTION CERTIFICATION MANAGEMENT SYSTEMS AND METHODS," the entire content of which is incorporated herein by reference for all purposes.

U.S. patent application Ser. No. 14/229,160, titled "System and Method for Network Provisioning," filed on Mar. 28, 2014 (issued as U.S. Pat. No. 9,515,876), U.S. patent application Ser. No. 15/369,564, titled "System and Method for Network Provisioning," filed on Dec. 5, 2016 (issued as U.S. Pat. No. 9,912,537), U.S. patent application Ser. No. 15/912,444, titled "System and Method for Network Provisioning," filed on Mar. 5, 2018 (issued as U.S. Pat. No. 10,341,176), and U.S. patent application Ser. No. 16/457,620, titled "System and Method for Network Provisioning," filed on Jun. 28, 2019 (issued as U.S. Pat. No. 10,778,512) are hereby incorporated in full by reference.

TECHNICAL FIELD

Embodiments of the present invention generally relate to systems and methods for applying a provisioned transport layer security certificate.

BACKGROUND

When a device user applies for a security certificate, the device may generate and send a certificate signing request to a certificate authority. In response to the certificate signing request, the certificate authority may provide the device with a certificate including a digital signature. However, certificate management systems may not be able to identify which session border controllers need to be provided a certificate and with which configuration.

SUMMARY

A network provisioning abstraction layer (NPAL) of a network provisioning system may identify a digital certificate file received from a certificate management system (CMS); identify a session boarder controller (SBC) that supports transport layer security (TLS); upload the digital certificate file to the identified SBC; install a remote certificate at the identified SBC; enable the remote certificate at the identified SBC; and send, based on enabling the remote certificate at the identified SBC, a notification to the CMS indicating that the remote certificate has been installed at the identified SBC.

A certificate management system (CMS) for installing a security certificate may identify a request, received from a certificate management tool (CMT), to install a certificate authority (CA) certificate; convert a filed received from the CA to a certificate file; download the certificate file to a network provisioning abstraction layer (NPAL) of a network provisioning system; install the CA certificate at the NPAL; identify a first notification, received from the NPAL, indicating that the NPAL has uploaded the certificate file and installed a remote certificate at a session boarder controller (SBC) that supports transport layer security (TLS); and send, to the CMT, a second notification indicating that the NPAL has uploaded the certificate file and installed a remote certificate at the SBC that supports transport layer security TLS.

A system for installing a security certificate may include a certificate management tool; a certificate management system (CMS); a network provisioning abstraction layer (NPAL) of a network provisioning system; and session boarder controllers (SBCs), wherein: the CMT is configured to send, to the CMS, to install a certificate authority (CA) certificate; the CMS is configured to send, to the NPAL, a digital certificate file based on the CA certificate; and the NPAL is configured to: identify a SBC of the SBCs that supports transport layer security (TLS); upload the digital certificate file to the identified SBC; install a remote certificate at the identified SBC; enable the remote certificate at the identified SBC; and send, based on enabling the remote certificate at the identified SBC, a notification to the CMS indicating that the remote certificate has been installed at the identified SBC.

DETAILED DESCRIPTION

Figure 1:
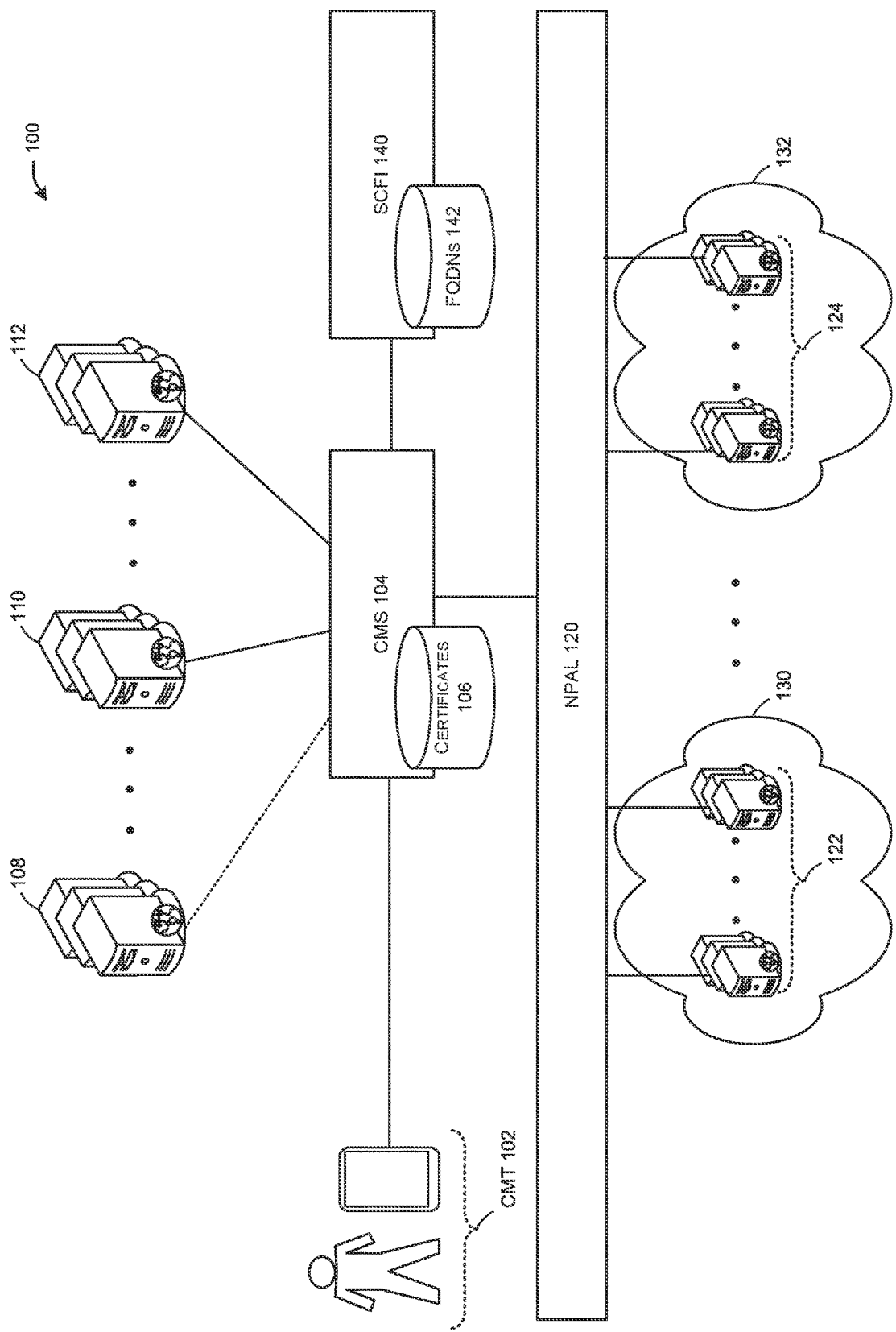
FIG. 1 illustrates an example system for managing security certificates in accordance with one embodiment.

Aspects of the present disclosure involve systems, methods, and the like, for enhanced transport layer security (TLS) encryption certification management.

Session border controllers (SBCs) may refer to network devices between multiple service provider networks and devices protecting a service provider's network and a backbone network with which to provide network services to customers. Deployed SBCs may use certificates from certificate authorities (CAs).

When a certificate management tool (CMT) uses TLS certificates, a certificate management system (CMS) may not be aware of which SBCs use TLS and can be provided the TLS certificates, and under which configurations.

There is therefore a need for enhanced TLS encryption certification management.

In one or more embodiments, a network provisioning abstraction layer (NPAL) of a network provisioning system may receive and process requests for network resources, and provides network provisioning instructions to the requested network resources. The NPAL may identify SBCs in a network, and determine which SBCs support TLS certificates and with which configurations. When a CMT installs a TLS certificate from a CA on a CMS, the CMS may convert the certificate to a file and provide the converted file to the NPAL. The NPAL may, for each identified SBC that supports TLS, upload the converted file to the SBC, generate and enable a remote TLS certificate for the SBC, and delete the converted file from the SBC. In this manner, the NPAL may facilitate the TLS certificate management process by identifying the SBCs and configurations on behalf of the CMS. For example, the NPAL may determine which sets of commands to run for specific SBCs to employ TLS certificates at the SBCs. The NPAL may break down master transactions into micro-tasks and execute them based on the specifics of any SBC, which the CMS may not have.

In one or more embodiments, the commands to which the NPAL has access to install certificates at an SBC may include modules coded into the NPAL. In this manner, the NPAL may be programmed to identify SBCs that use TLS and install certificates at the SBCs that use TLS without a CMS having to identify the SBCs supporting TLS and the SBC commands needed to install the certificates at the SBCs.

In one or more embodiments, the NPAL may facilitate certificate deletion and renewal at SBCs. For example, a TLS certificate may expire after a time period (e.g., one year), so the NPAL may delete the TLS certificate from the SBC after such time and/or may renew TLS certificates at such time.

In one or more embodiments, the NPAL may apply a TLS certificate to multiple customers of a SBC. The NPAL may soak the certificate for a time, or automatically apply the certificate to multiple users. The NPAL also may create a trunk root for a TLS certificate.

In one or more embodiments, newly added SBCs may need to install SBC security certificates. TLS certificates for SBCs may need the SBC certificates. The NPAL may identify the SBCs that use TLS certificates and may install the CA certificate on the SBCs accordingly.

In one or more embodiments, to generate and install SBC certificates needed for the TLS certificates, a CMT may create an SBC certificate workflow at the CMS, which may request SBCs from the NPAL. The NPAL may return the SBC names to the CMS, which may return the SBC names to the CMT. The CMT may select a SBC, and the CMS may generate private and public keys for the selected SBC. The CMS may request (e.g., using a CSR) the CA to provide an identity certificate and its immediate root certificates, and the CA may provide them to the CMS. The CMS may verify the identity certificate and its immediate root certificates, and may notify the CMT that the SBC certificate has been generated. The CMS may combine the identity certificate and a private key into a file (e.g., a PKCS #12 file—public key cryptography standards #12), and may install the SBC certificate at the NPAL, which may download the file from the CMS. The NPAL may upload the file to the SBC and generate a local certificate at the SBC, enable the local certificate at the SBC, and delete the local certificate at the SBC.

In one or more embodiments, to apply an SBC certificate version, a CMT may apply the SBC certificate version at the NPAL. The NPAL may identify TLS profiles that need to be updated with the SBC certificate version. Instead of the CMT needing to identify the TLS profiles, the NPAL identifies them and updates the TLS profiles for each SBC with TLS profiles needing to be updated with the SBC certificate version.

In one or more embodiments, TLS profiles available to the NPAL may include a gateway identifier, a certificate identifier, the versions and expiration dates of the certificates, customers using the TLS profiles, and the certificate versions used by the customers. The NPAL may identify when a customer is using a certificate version that is outdated, and may update them with a new SBC certificate version.

In one or more embodiments, the NPAL may install a CA certificate version at one or more SBCs. When a CMT installs a new CA certificate version at the CMS, the CMS may convert the file received from the CA to a digital certificate file (e.g., DER file) and download the digital certificate file to the NPAL. The NPAL may identify SBCs that support TLS, and for each identified SBC supporting TLS, may upload the digital certificate to the SBC, create and enable a remote certificate at the SBC, and delete the digital certificate file from the SBC.

In one or more embodiments, the CMS may configure a CA connector, create new certificate policies, create new CA policies, create role-based access control (RBAC) entities, create workflows, and/or create reports. The NPAL may include certificate management APIs with which the CMS may provide requests, new certificates, certificate updates, and the like, to be propagated to SBCs.

In one or more embodiments, a CA certificate normally has one CA certificate version. However, during a renewal, the CA certificate may have two versions: the current version about to expire, and a new "renewing" version.

In one or more embodiments, a TLS profile may include a gateway identifier, a SBC SIP IP address, a SBC certificate version name, a SBC certificate FQDN, and other data. A SBC certificate version may include a SBC certificate version name, a SBC certificate name, and SBC certificate version, a valid end date, and an indicator for "is current." A SBC certificate may include a gateway identifier, a SBC certificate instance, a SBC certificate name, a common name, and other data. A TLS profile may specify a local certificate for a SBC.

The present disclosure provides enhanced techniques in which the tasks of installing, updating, and removing TLS certificates at/from SBCs may be offloaded to the NPAL. Because the NPAL may be programmed to identify the SBCs that may use TLS and may need to update TLS certificates, the NPAL may identify the SBCs and, based on the specific configuration of the SBCs, determine the tasks, configurations, and commands needed to perform the installation, updating, and removing of TLS certificates at/from the SBCs.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example system 100 for managing security certificates in accordance with one embodiment.

Referring to FIG. 1, a CMT 102 (e.g., an executable program on a device, the program used for certificate creation, editing, conversion, etc.) may request to a CMS 104 to install, update, and/or delete security certificates 106 at SBCs. The security certificates 106 may be provided by CAs (e.g., CA 108, CA 110, CA 112, etc.). The CMS 104 may identify which of the SBCs may use TLS and/or may need an updated certificate. The CMS 104 may call (e.g., using application programming interface calls) an NPAL 120 to install certificates, update certificates, and/or delete certificates at SBCs (e.g., SBCs 122, SBCs 124) at one or more networks (e.g., network 130, network 132, etc.). A SCFI 140 (e.g., SBC certificate FQDN inventory) using fully qualified domain names (FQDNs) 142 may receive SBC certificates (e.g., the security certificates 106) from the CMS 104, inventory SBC certificate FQDNs for SIP signaling IP addresses, and allocate a next available SBC certificate FQDN for an SBC SIP signaling IP address. For example, a TLS client may verify that a TLS identify certificate includes an expected FQDN, which may be the common name (e.g., example0.com) or alternative name of the certificate. A TLS client may use DNS to verify that the expected FQDN resolves to the TLS SIP IP address.

Figure 2:
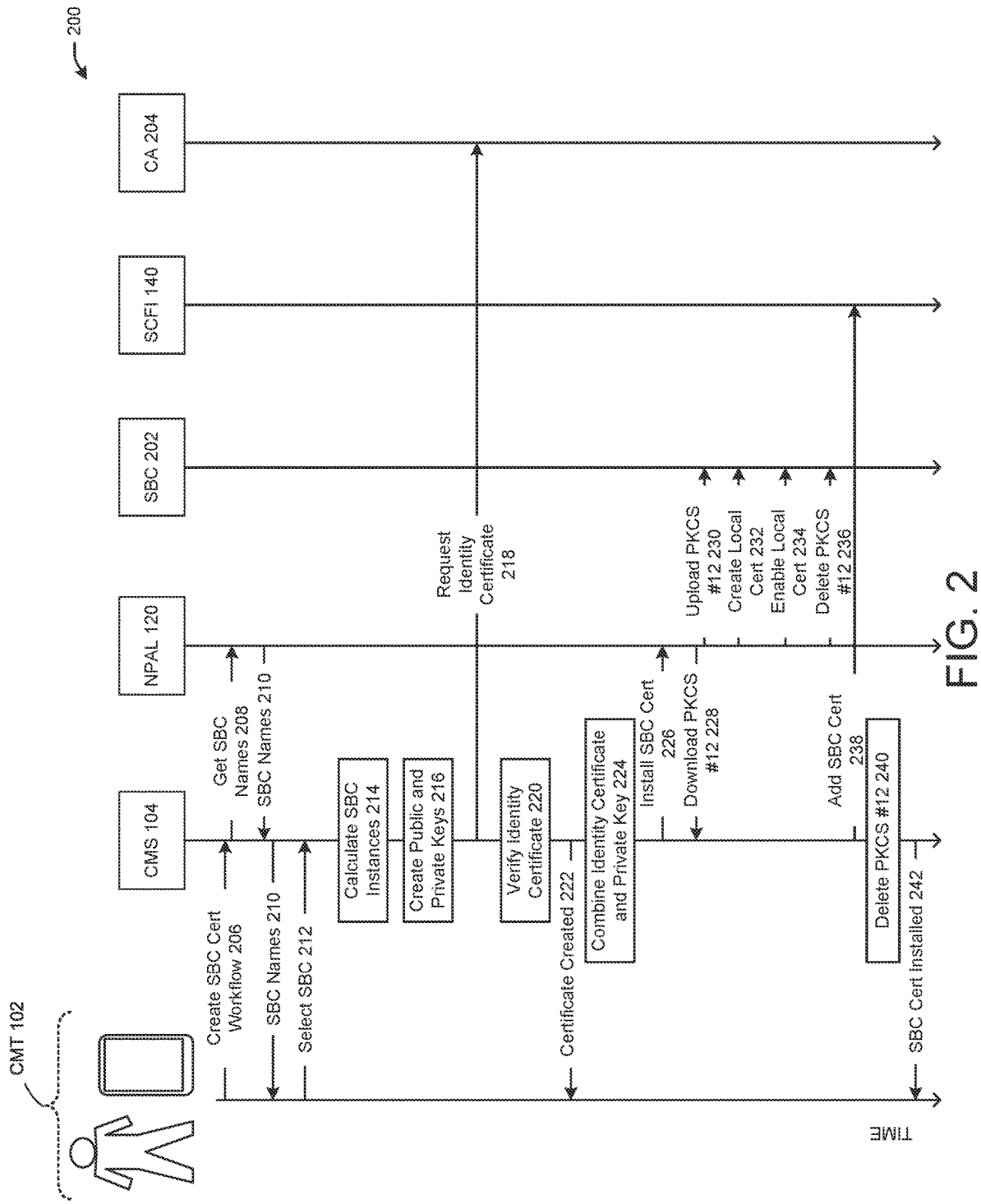
FIG. 2 is a process for creating and installing a session boarder controller certificate in accordance with one embodiment.

FIG. 2 is a process 200 for creating and installing a session boarder controller certificate in accordance with one embodiment.

Referring to FIG. 2, the process 200 may include the CMT 102, the CMS 104, the NPAL 120, and the SCFI 140 of FIG. 1, a SBC 202, and a CA 204. The CMT 102 may generate a SBC certificate workflow 206 at the CMS 104, which may send an API request 208 to the NPAL 120 for SBC names. The NPAL 120 may return the SBC names 210 in an API response. The CMS 104 may provide the SBC names 210 to the CMT 102. The CMS 104 may select a SBC 212, calculate SBC instances 214, create public and private keys 216, along with a CSR. The CMS 104 may send a CSR to the CA 204 (e.g., an API GET request 218 for an identity certificate), which the CA 204 may provide in an API response. The CMS 104 may verify the identity certificate 220 provided by the CMS 104. The CMS 104 may notify the CMT 102 that the certificate has been created 222. The CMS 104 may combine the identity certificate and private key into a certificate file 224 (e.g., a PKCS #12 file). The CMS 104 may install the SBC certificate 226 at the NPAL 120, and the NPAL 120 may download the PKCS #12 file 228 from the CMS 104. The NPAL 120 may upload the PKCS #12 file 230 to the SBC 202, create a local certificate 232 at the SBC 202, enable the local certificate 234 at the SBC 202, and delete the PKCS #12 file 236. The CMS 104 may add the SBC certificate 238 to the SCFI 140. The CMS 104 may delete the PKCS #12 240 and notify the CMT 102 that the SBC certificate has been installed 242 at the SBC 202.

Figure 3:
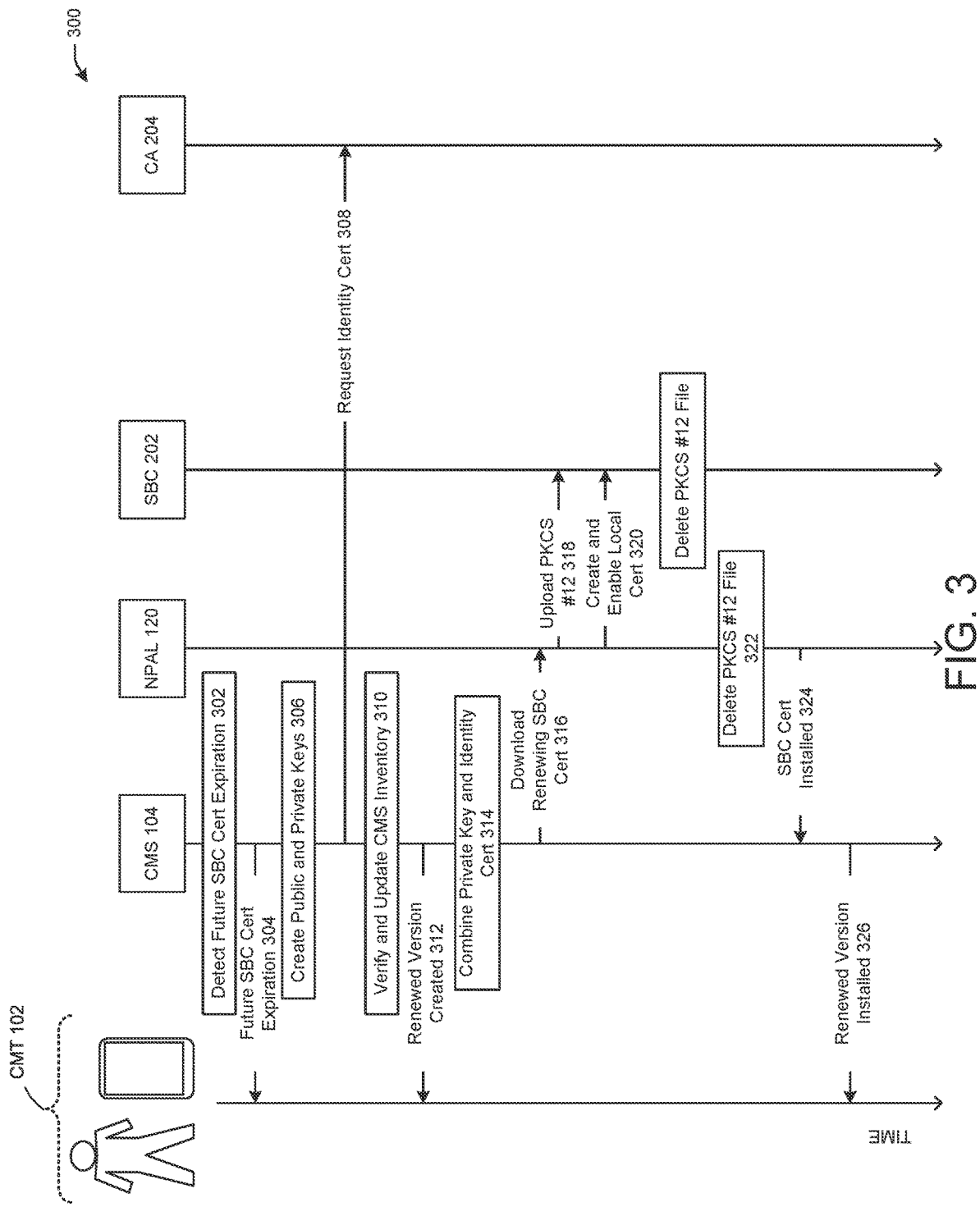
FIG. 3 is a process for updating a security certificate in accordance with one embodiment.

FIG. 3 is a process 300 for updating a security certificate in accordance with one embodiment.

Referring to FIG. 3, the process may include the CMT 102, the CMS 104, and the NPAL 120 of FIG. 1, the SBC 202 and the CA 204 of FIG. 2. The CMS 104 may detect a future SBC certificate expiration 302 (e.g., by having access to certificates and their expiration times). The CMS 104 may notify the CMT 102 of the future SBC certificate expiration 304. The CMS 104 may create private and public keys and CSR for a renewing SBC certificate 306, and may request 308 (e.g., via CSR) the CA 204 to provide an identity certificate for the renewing SBC certificate. The CA 204 may return the identity certificate. The CMS 104 may verify and update CMS inventory 310 (e.g., the security certificates 106 of FIG. 1), and may notify 312 the CMT 102 that the renewed SBC certificate has been created. The CMS 104 may combine 314 the private key and identity certificate (e.g., into a PKCS #12 file), and the NPAL 120 may download 316 the renewing SBC certificate (e.g., including a uniform resource locator to the PKCS #12 file). The NPAL 120 may upload 318 the PKCS #12 file to the SBC 202, and create and enable 320 a local certificate at the SBC 202. The SBC 202 may delete 322 the PKCS #12 file. The NPAL 120 may delete the PKCS #12 file. The NPAL 120 may notify 324 the CMS 104 that the SBC certificate has been installed, and the CMS 104 may notify 326 the CMT 102 that the SBC certificate has been installed (e.g., the renewing certificate).

Figure 4:
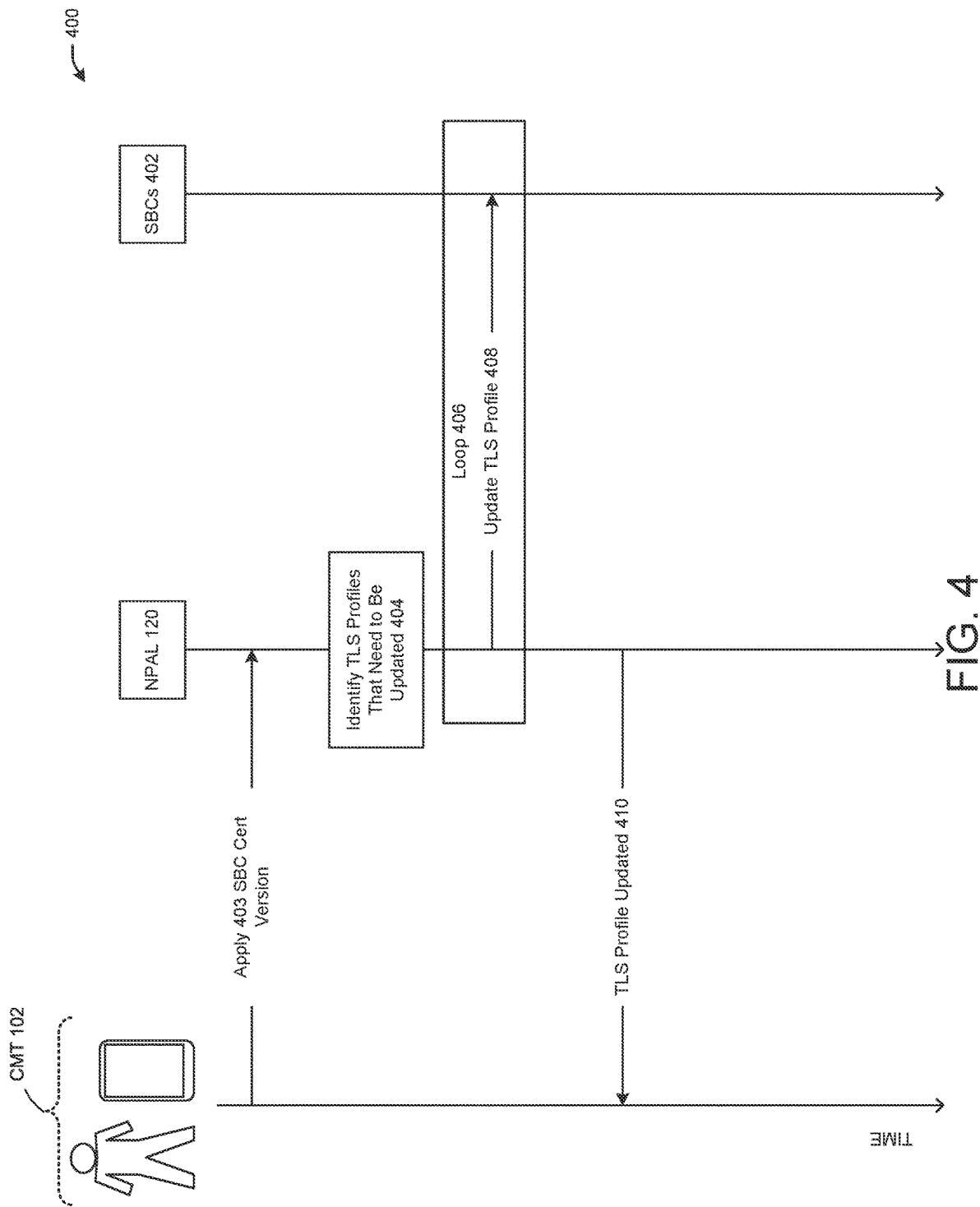
FIG. 4 is a process for updating a security certificate in accordance with one embodiment.

FIG. 4 is a process 400 for updating a security certificate in accordance with one embodiment.

Referring to FIG. 4, SBCs 402 are shown. The CMT 102 may request to the NPAL 120 to apply 403 a SBC certificate version wherever it needs to be applied (e.g., the SBC may not be identified). The NPAL 120 may identify 404 TLS profiles (e.g., at SBCs) that need to be updated (e.g., based on timing since last update, update requests, etc.). Based on the SBCs which have TLS profiles needing to be updated with the updated SBC certificate version, the NPAL 120, in a loop 406, may update 408 the TLS profile at each of the identified SBCs 402. Once the NPAL 120 has updated the TLS profiles at the identified SBCs (e.g., identified on behalf of the CMT 102), the NPAL 120 may notify 410 the CMT 102 that the TLS profile has been updated.

Figure 5:
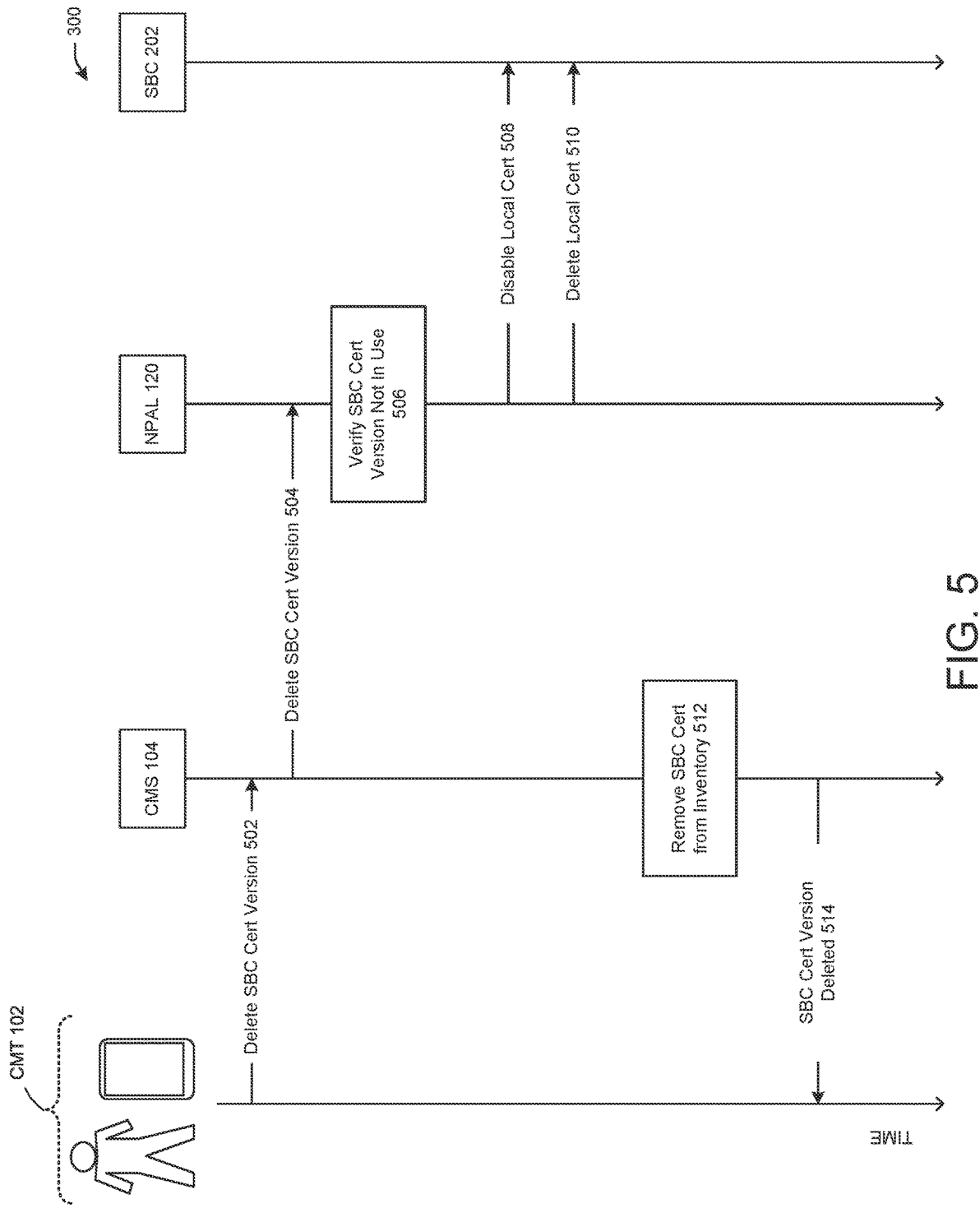
FIG. 5 is a process for deleting a security certificate in accordance with one embodiment.

FIG. 5 is a process 500 for deleting a security certificate in accordance with one embodiment.

Referring to FIG. 5, the CMT 102 requests 502 the CMS 104 to delete a SBC certificate version, and the CMS 104 requests 504, for the CMT 102, the NPAL 120 to delete the SBC certificate version. The NPAL 120 may verify 506 that the SBC certificate version is not in use at the SBC 202 (e.g., by checking the version of the SBC certificate used by the SBC 202). The NPAL 120 may disable 508 and delete 510 the local certificate at the SBC 202. The CMS 104 may remove 512 the SBC certificate from inventory (e.g., the security certificates 106 of FIG. 1), and may notify 514 the CMT 102 that the SBC certificate version has been deleted.

Figure 6:
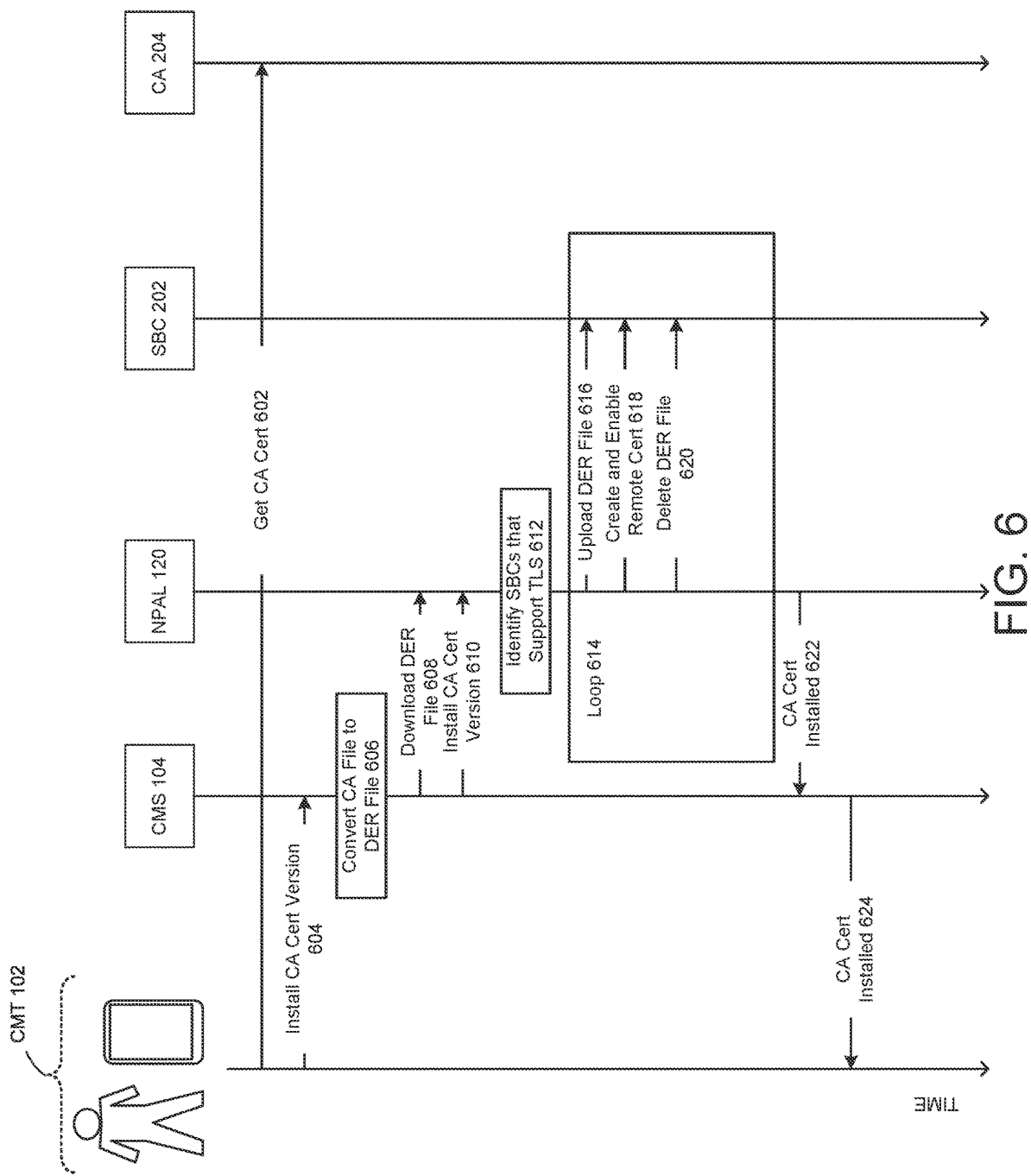
FIG. 6 is a process for installing a certificate authority certificate in accordance with one embodiment.

FIG. 6 is a process 600 for installing a certificate authority certificate in accordance with one embodiment.

Referring to FIG. 6, the CMT 102 may request 602 (e.g., via API GET call) a CA certificate from the CA 204, which may return the CA certificate. The CMT 102 may install 604 the CA certificate version at the CMS 104, which may retrieve a CA file from the CA 204 (e.g., a website of the CA 204) and may convert 606 the CA file to a certificate file (e.g., a DER file—digital certificate file). The NPAL 120 may download 608 the DER file from the CMS 104, and the CMS 104 may install 610 the CA certificate version at the NPAL 120. The NPAL 120 may identify 612 SBCs that support TLS (e.g., without being provided the SBCs from the CMS 104 or the CMT 102). For each of the SBCs (e.g., the SBC 202) identified as supporting TLS, in a loop 614, the NPAL 120 may upload 616 the DER file to the SBC 202, create and enable 618 a remote certificate at the SBC 202, delete the DER file from the SBC 202, and delete 620 the DER file from the NPAL 120. The NPAL 120 may notify 622 the CMS 104 that the CA certificate has been installed at the SBC, and the CMS 104 may notify 624 the CMT 102 that the CA certificate has been installed.

Figure 7:
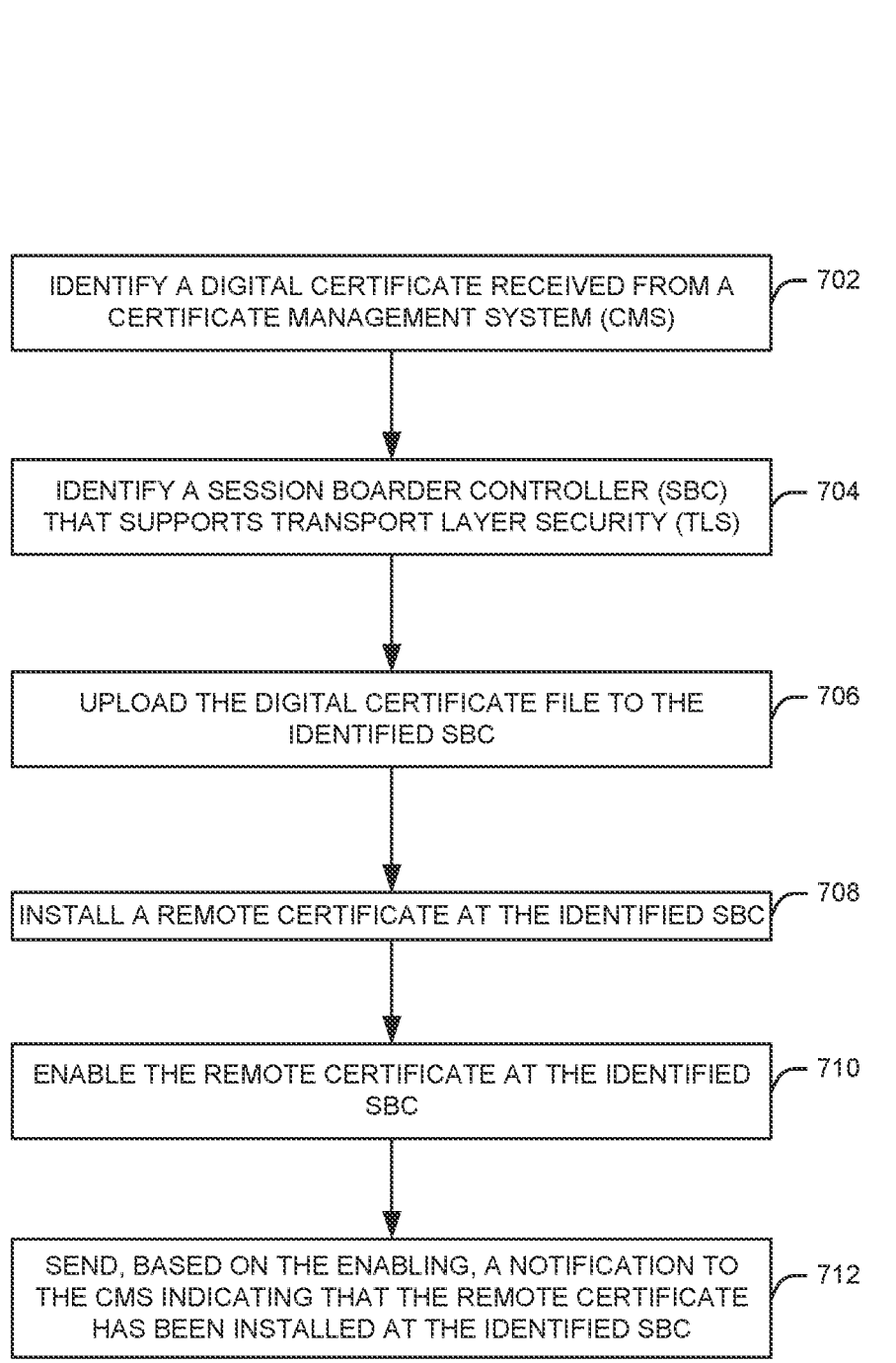
FIG. 7 is a flow for a process for installing a certificate authority certificate in accordance with one embodiment.

FIG. 7 is a flow for a process 700 for installing a certificate authority certificate in accordance with one embodiment.

At block 702, a device (e.g., the NPAL 120 of FIG. 1) may identify a digital certificate received from a CMS (e.g., the CMS 104 of FIG. 1). The CMS 104 may provide the digital certificate, which may be based on a CMT request (e.g., from the CMT 102 of FIG. 1).

At block 704, the device may identify one or more SBCs that support TLS. The device may have access to TLS profiles at SBCs, including version information, and may determine which SBCs have TLS profiles, and which TLS profiles may need to add, update, or delete a local certificate (e.g., a TLS certificate stored locally for the CMT 102 at a SBC).

At block 706, the device may upload the digital certificate file to the identified SBCs. At block 708, the device may install a remote certificate (e.g., TLS certificate) at the identified SBCs. At block 710, the device may enable the remote certificate for use at the identified SBC. The uploading, installing, and enabling may require multiple tasks and/or sub-tasks and configurations, depending on the particular SBC. The device may have access to the tasks, sub-tasks, and configurations needed to facilitate the uploading, installing, and enabling. The tasks, sub-tasks, and configurations may differ at various SBCs.

At block 712, the device may send, based on the enabling, a notification to the CMS indicating that the remote certificate has been installed at one or more SBCs.

It is understood that the above descriptions are for purposes of illustration and are not meant to be limiting.

Figure 8:
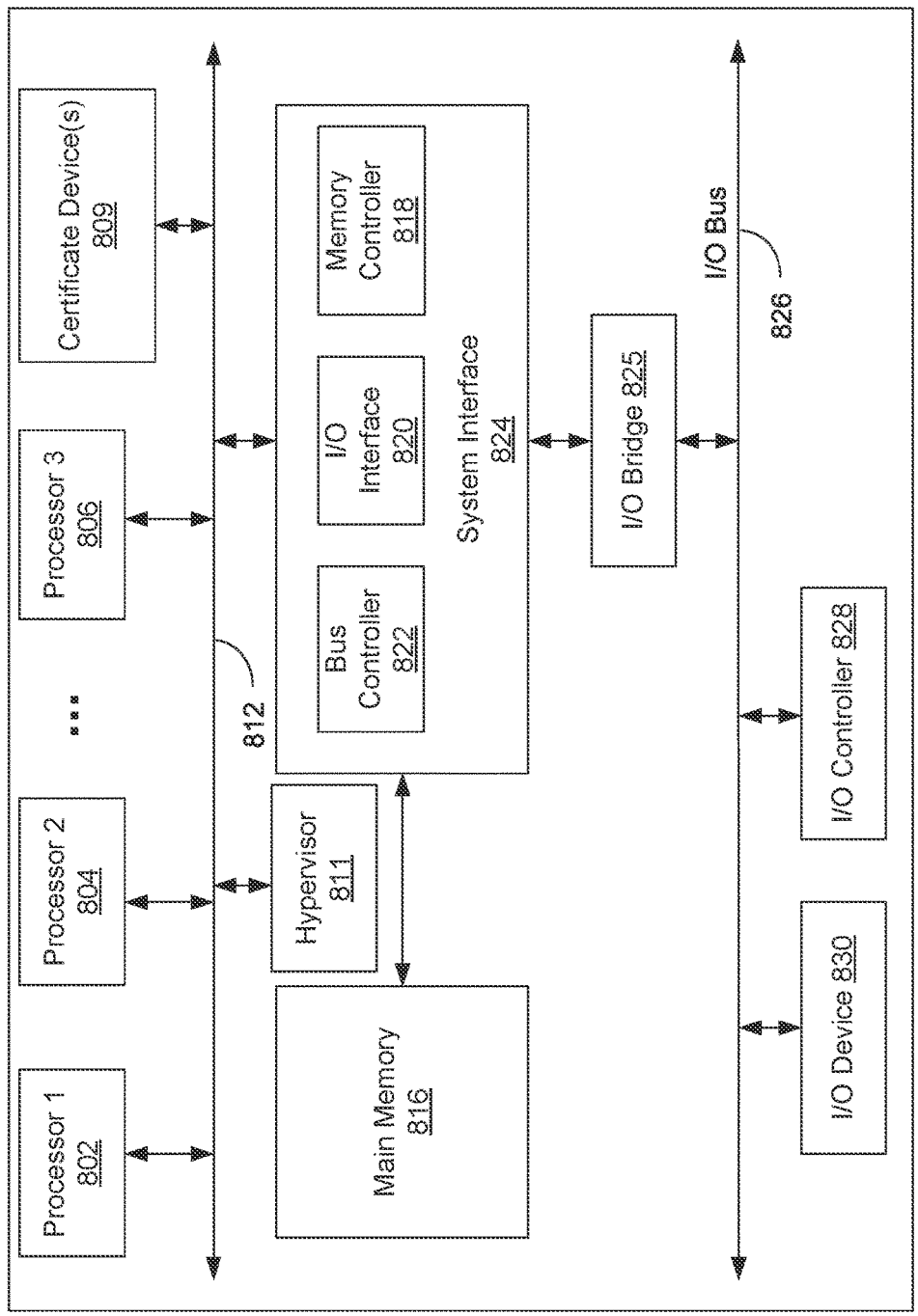
FIG. 8 is a diagram illustrating an example of a computing system that may be used in implementing embodiments of the present disclosure.

FIG. 8 is a block diagram illustrating an example of a computing device or computer system 800 which may be used in implementing the embodiments of the components of the network disclosed above. For example, the computing system 800 of FIG. 4 may represent at least a portion of the system 100 shown in FIG. 1, as discussed above. The computer system (system) includes one or more processors 802-806, one or more certificate devices 809 (e.g., representing the CMS 104 of FIG. 1, the CAs 108-112, and/or the NPAL 120 of FIG. 1), and a hypervisor 811 (e.g., to instantiate and run virtual machines). Processors 802-806 may include one or more internal levels of cache (not shown) and a bus controller 822 or bus interface unit to direct interaction with the processor bus 812. Processor bus 812, also known as the host bus or the front side bus, may be used to couple the processors 802-806 with the system interface 824. System interface 824 may be connected to the processor bus 812 to interface other components of the system 800 with the processor bus 812. For example, system interface 824 may include a memory controller 818 for interfacing a main memory 816 with the processor bus 812. The main memory 816 typically includes one or more memory cards and a control circuit (not shown). System interface 824 may also include an input/output (I/O) interface 820 to interface one or more I/O bridges 825 or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system outlined in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 806 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for installing a security certificate, the method comprising:
   identifying, by at least one processor of a network provisioning abstraction layer (NPAL) of a network provisioning system, a digital certificate file received from a certificate management system (CMS);
   identifying, by the at least one processor, a session boarder controller (SBC) that supports transport layer security (TLS);
   uploading, by the at least one processor, the digital certificate file to the identified SBC;
   converting, by the at least one processor, the digital certificate file to a remote certificate at the identified SBC;
   enabling, by the at least one processor, the remote certificate at the identified SBC; and
   sending, by the at least one processor, based on enabling the remote certificate at the identified SBC, a notification to the CMS indicating that the remote certificate has been installed at the identified SBC,
   wherein the digital certificate file is associated with a request from a certificate management tool to install the remote certificate.

2. The method of claim 1, wherein the digital certificate file is based on a certificate authority certificate of a certificate authority website.

3. The method of claim 1, further comprising:
   identifying a second SBC that supports TLS;
   uploading the digital certificate file to the second identified SBC;
   installing a remote certificate at the second identified SBC;
   enabling the remote certificate at the second identified SBC; and
   sending, based on enabling the remote certificate at the second identified SBC, a notification to the CMS indicating that a remote certificate has been installed at the second identified SBC.

4. The method of claim 3, wherein the uploading, installing, and enabling at the identified SBC use a first configuration, and wherein the uploading, installing, and enabling at the second identified SBC use a second configuration different than the first configuration.

5. The method of claim 1, wherein the CMS does not provide an indication of the identified SBC to the NPAL.

6. The method of claim 1, further comprising:
   deleting the remote certificate from the identified SBC.

7. The method of claim 1, further comprising:
   identifying an application programming interface (API) call received from the CMS, the API call requesting names of SBCs using TLS; and
   sending an API response to the CMS comprising the names of the SBCs using TLS.

8. The method of claim 1, further comprising:
   identifying a renewing certificate from the CMS; and
   uploading a cryptography file to the identified SBC based on the renewing certificate.

9. A certificate management system (CMS) for installing a security certificate, the CMS comprising: a memory and at least one processor, the at least one processor is configured to:
   identify a request, received from a certificate management tool (CMT), to install a certificate authority (CA) certificate;
   convert a filed received from the CA to a certificate file;
   download the certificate file to a network provisioning abstraction layer (NPAL) of a network provisioning system;
   install the CA certificate at the NPAL;
   identify a first notification, received from the NPAL, indicating that the NPAL has uploaded the certificate file and installed a remote certificate at a session boarder controller (SBC) that supports transport layer security (TLS); and
   send, to the CMT, a second notification indicating that the NPAL has uploaded the certificate file and installed a remote certificate at the SBC that supports transport layer security TLS.

10. The CMS of claim 9, wherein the CMS does not identify the SBC to the NPAL.

11. The CMS of claim 9, wherein the at least one processor is further configured to:
    send an application programming interface (API) call received to the NPAL, the API call requesting names of SBCs using TLS;
    receiving an API response from the NPAL comprising the names of the SBCs using TLS;
    identify a selection of a second SBC received from the CMT; and
    install a certificate of the second SBC at the NPAL.

12. The CMS of claim 9, wherein the at least one processor is further configured to:
    identify a first request, received from the CMT, to delete a SBC certificate version;
    send a second request, to the NPAL, to delete the SBC certificate version;
    identify an indication, received from the NPAL, that the SBC certificate version has been deleted; and
    send, to the CMT, a notification that the SBC certificate version has been deleted.

13. A system for installing a security certificate, the system comprising:
    a memory and at least one processor;
    a certificate management tool;
    a certificate management system (CMS);
    a network provisioning abstraction layer (NPAL) of a network provisioning system; and
    session boarder controllers (SBCs), wherein:
    the CMT is configured to send, to the CMS, to install a certificate authority (CA) certificate;
    the CMS is configured to send, to the NPAL, a digital certificate file based on the CA certificate; and
    the NPAL is configured to:
    identify a SBC of the SBCs that supports transport layer security (TLS);
    upload the digital certificate file to the identified SBC;
    install a remote certificate at the identified SBC;
    enable the remote certificate at the identified SBC; and
    send, based on enabling the remote certificate at the identified SBC, a notification to the CMS indicating that the remote certificate has been installed at the identified SBC.

14. The system of claim 13, wherein the NPAL is further configured to:
    identify a second SBC that supports TLS;
    upload the digital certificate file to the second identified SBC;
    install a remote certificate at the second identified SBC;
    enable the remote certificate at the second identified SBC; and send, based on enabling the remote certificate at the second identified SBC, a notification to the CMS indicating that a remote certificate has been installed at the second identified SBC.

15. The system of claim 13, wherein the uploading, installing, and enabling at the identified SBC use a first configuration, and wherein the uploading, installing, and enabling at the second identified SBC use a second configuration different than the first configuration.

16. The system of claim 13, wherein the CMS does not provide an indication of the identified SBC to the NPAL.

17. The system of claim 13, wherein the NPAL is further configured to delete the remote certificate from the identified SBC.

18. The system of claim 13, wherein the NPAL is further configured to:
   identify an application programming interface (API) call received from the CMS, the API call requesting names of SBCs using TLS; and
   send an API response to the CMS comprising the names of the SBCs using TLS.

19. The system of claim 13, wherein the NPAL is further configured to:
   identify a renewing certificate from the CMS; and
   upload a cryptography file to the identified SBC based on the renewing certificate.

* * * * *